United States Patent [19]

Benschop

[11] Patent Number: 4,845,352

[45] Date of Patent: Jul. 4, 1989

[54] SCANNING DIFFERENTIAL PHASE CONTRAST MICROSCOPE

[75] Inventor: Jozef P. H. Benschop, Eindhoven, Netherlands

[73] Assignee: U.S. Philips Corporation, New York, N.Y.

[21] Appl. No.: 130,363

[22] Filed: Dec. 8, 1987

[30] Foreign Application Priority Data

Dec. 8, 1986 [NL] Netherlands .......................... 8603108

[51] Int. Cl.$^4$ .............................................. G01J 1/20
[52] U.S. Cl. .................................... 250/201; 250/216; 350/507
[58] Field of Search ............ 250/201 DF, 201 R, 216; 369/44, 45, 46; 350/507

[56] References Cited

U.S. PATENT DOCUMENTS 3,969,576  7/1976  Boonstra et al. .................... 250/201
4,631,397 12/1986  Ohsato et al. ....................... 250/201
4,689,479  8/1987  Tatsuno et al. ...................... 369/45

Primary Examiner—David C. Nelms
Assistant Examiner—William L. Oen

[57] ABSTRACT

An objective system (20) focusses the radiation from a radiation source (10) to a diffraction-limited spot (A) which is imaged on two point detectors (61, 62) by an imaging system (40) and a beam divider (60). By using this confocal principle, a differential phase contrast microscope is obtained having a low sensitivity to details which are out of focus, an increased resolution in the object plane and little crosstalk between the two detectors.

7 Claims, 2 Drawing Sheets

SCANNING DIFFERENTIAL PHASE CONTRAST MICROSCOPE

BACKGROUND OF THE INVENTION

The invention relates to a scanning microscope for observing an object placed in an object plane. An objective system focuses radiation emitted by a coherent radiation source to a radiation spot in the object plane. Two radiation detectors are arranged so that discrete halves of the radiation beam from the radiation spot are detected by respective detectors. The spot is preferably diffraction-limited. A microscope of this type is eminently suitable for observing phase structures in an object such as a biological cell or a piece of semiconductor material which has undergone one or more process steps for providing an integrated circuit therein.

A microscope of this type is described in the Article "Improved imaging of phase gradients in scanning optical microscopy" by D. K. Hamilton et al. in the magazine "Journal of Microscopy", Vol. 135, Pt. 3, pages 275–286. In the known microscope the radiation passing through the object is detected by two radiation-sensitive detectors each receiving approximately half of the radiation cone and converting it into an electrical signal. The detectors are juxtaposed and may be partly covered by a diaphragm so that the shape of the radiation-sensitive surface of the detectors is influenced. A high resolution can be attained by suitably choosing this shape, that is to say, by adapting it to the nature of the object to be observed.

However, if the object is not well focussed or if it has a finite thickness, the radiation detected by the detectors is greatly influenced by structures outside the image plane of the objective system. For example, radiation from an amplitude structure present outside the image plane may influence the signal which originates from a phase structure in the image plane. The amplitude or phase signal derived from the detector signals is then no longer an exact reproduction of a structure in the object plane. Moreover, there is of course a loss of definition in the observed image.

SUMMARY OF THE INVENTION

In the microscope according to the invention the detectors are point detectors, a beam divider is arranged in the radiation path from the object plane to the radiation detectors, and an imaging system with which the object plane is imaged on the detector is arranged between the object plane and each detector. The imaging system may be separate for each of the detectors, but it may also be common for both detectors. A point detector is to be understood to mean a detector whose radiation-sensitive surface is smaller than the surface of the diffraction-limited spot. In practice such a detector is realized by placing a diaphragm having a very small aperture, a so-called pinhole diaphragm, in front of a radiation-sensitive element, for example a photo-diode.

A microscope in which both the radiation source is imaged on the object plane and in which the object plane is imaged on a point detector is referred to as a confocal microscope. Such a microscope has the advantage of a very small depth of field. Details which are present outside the object plane receive only a part of the incident radiation beam and are imaged out of focus on the point detector. Thus, these details have only a slight influence on the intensity of the detected signal. A confocal microscope has also a better resolution in the object plane because, due to the two imaging systems, a point in the object plane has a narrower point response than in a conventional microscope. These advantages are described, inter alia, in the Article "Imaging Properties and Applications of Scanning Optical Microscopes" by T. Wilson in the magazine "Applied Physics", Volume 22, pages 119–128 (1980). As a result of the small depth of field the use of the confocal principle in a differential phase contrast microscope has the advantage that the disturbance of the observed signals by structures present outside the image plane is suppressed.

The invention is based on the recognition that, unlike the prevailing view, the principle of confocal microcopy can indeed be used advantageously in a differential phase contrast microscope.

The beam divider may be a double optical wedge.

A beam splitter can be arranged in the radiation path from the radiation source to the object plane to couple out a part of the reflected radiation and direct it towards the point detectors. To use available radiation efficiently, the radiation source should be suitable for emitting a linearly polarized radiation beam, the beam splitter should be a polarization-sensitive beam splitter, and a $\lambda/4$ plate should be arranged between the beam splitter and the object plane, where $\lambda$ is the wavelength of the radiation used.

The objective system and imaging system may have at least one optical element in common. If the major lens (or lenses) of the objective and imaging systems are equal, a number of aberrations are compensated for. In addition there are fewer alignment problems and a certain cost-saving is obtained.

It stands to reason that a microscope of this type with which only one single point of the object is observed simultaneously must be provided with means for moving said point and the object with respect to each other. These means may comprise, for example a table for arranging the object thereon, which table can be moved parallel to the object plane. These means may, for example, also be constituted by controllable beam-deflecting elements such as moving mirrors arranged both in the radiation path of the radiation towards the object plane and in the radiation path of the radiation originating from the object plane.

Beam deflecting means can be arranged in the radiation path between the beam splitter and the object plane. These means may include a pivotal mirror for scanning a line on the object and possibly a second pivotal mirror by which a surface can be scanned in co-operation with the first mirror. By placing the beam-deflecting means in the radiation path of radiation which is incident on the object as well as radiation from the object, synchronization of two scanning systems can be dispensed with.

DETAILED DESCRIPTION OF THE PREFERRED EMBODIMENTS

Figure 1A:
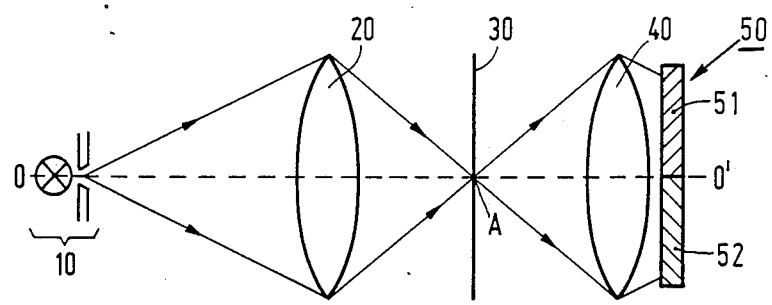
FIG. 1a is a diagrammatic view of a known differential phase contrast microscope.

In FIG. 1a the reference numeral 10 denotes a radiation source which may be a laser or, as is shown, a combination of an incoherent radiation source 11 emitting a broad beam and a diaphragm 12 placed behind it. The radiation emitted by the radiation source 10 is focussed by an objective system 20 to a small radiation spot A in the object plane 30. The radiation from the radiation spot is detected by means of the radiation-sensitive detection system 50. A collector system 40 may be arranged between the object plane 30 and the detection system 50. The radiation detection system 50 comprises two radiation-sensitive detectors 51 and 52 which are arranged as close as possible to each other on either side of the optical axis O-O' of the microscope. The phase and amplitude image of an object placed in the object plane 30 is obtained by scanning the object with the radiation spot and by subtracting and adding the output signals of the two detectors 51 and 52, respectively, and by further processing them in an image-processing system not shown.

The objective system 20 and the collector system 40 are shown in the Figure as single biconvex lenses. These may of course also be composite lenses with which a better result can be obtained by compensating aberrations.

Figure 1B:
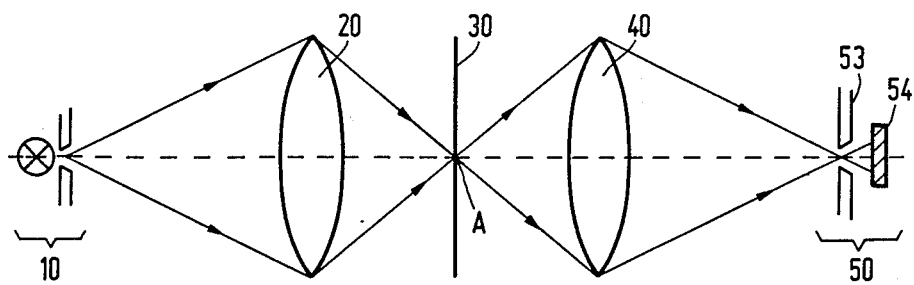
FIG. 1b is a diagrammatic view of a known confocal microscope.

FIG. 1b illustrates the principle of a known confocal microscope. The radiation emitted by a radiation source 10 is focused by an objective system 20 to a preferably diffraction-limited radiation spot A in the object plane 30. Likewise as with the differential phase contrast microscope, the radiation source may be a laser or an incoherent radiation source with a diaphragm placed behind it. In the latter case the diaphragm must, however, have such a small aperture that actually a coherent light source is obtained. Such a diaphragm is referred to as a pinhole diaphragm.

The radiation spot formed in the object plane is imaged by the imaging lens 40 on the point detector 50. This detector comprises a pinhole diaphragm 53 placed in the imaging plane, which diaphragm also has a very small aperture, and a radiation-sensitive detector 54, for example a photodiode placed behind it.

A confocal microscope is substantially insensitive to details of the object which are not located in the scanned object plane 30. Since these details are only irradiated by a part of the radiation beam, which details are imaged blurred on the plane of the radiation-sensitive detector and since only a part of the blurred image is observed by the point detector 50, these details influence the detected signal to a very small extent only.

Figure 2:
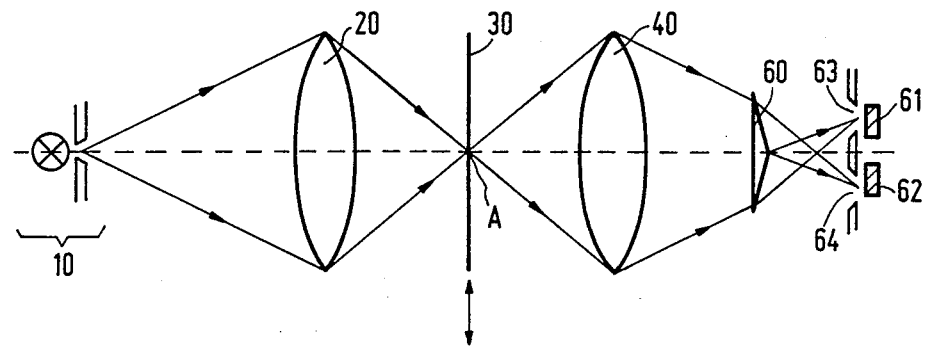
FIG. 2 illustrates the principle of a confocal differential phase contrast microscope according to the invention and FIG. 3 is a diagrammatic view of such a microscope.

FIG. 2 illustrates the principle of the microscope according to the invention. As in FIGS. 1a and 1b, a radiation source 10 is shown, as well as an objective system 20 which focusses the radiation from the radiation source 10 to a preferably diffraction-limited spot A in the object plane 30. A beam divider 60, for example a double optical wedge, divides the radiation beam into two sub-beams which are added to two point detectors constituted by the radiation-sensitive detectors 61 and 62, respectively, and the pinhole diaphragms 63 and 64 placed in front of them. A further embodiment of the beam divider 60 comprises, for example a double optical wedge composed of two prisms with their narrow sides placed against each other or two plane mirrors whose reflecting surfaces extend at an angle to each other.

The radiation beam from the spot A is received by an imaging system 40 which is arranged in such a way that the object plane 30 is imaged on the plane of the two point detectors 61, 63 and 62, 64, respectively. As is shown in FIG. 2, the imaging system 40 may be arranged between the beam divider 60 and the object plane 30, but different configurations are alternatively possible, for example arranging the system 40 between the beam divider 60 and the detectors 61, 62, possibly as two separate imaging systems between the beam divider and each of the two detectors.

By dividing the radiation beam from the object plane 30 into two sub-beams, a differential phase contrast microscope is obtained which has as advantage over a known phase contrast microscope. The disturbance of the radiation received by the two detectors due to the fact that part of the object is not located in the image plane is small, and consequently the detector signals and the amplitude and phase images reconstructed therefrom are substantially unaffected by details outside the image plane and that the point response in the object plane is increased.

Figure 3:
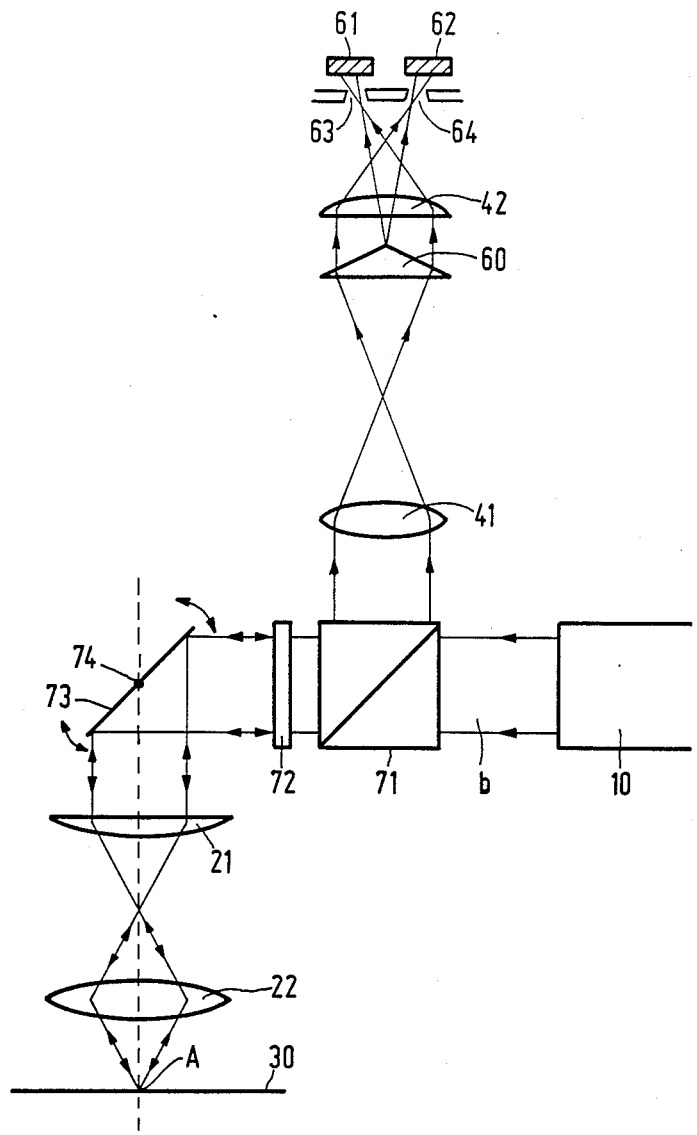

FIG. 3 shows a possible practical embodiment of the microscope according to the invention. Here again the reference numeral 10 denotes a radiation source, for example a laser emitting a parallel coherent radiation beam b. This parallel beam traverses the lenses 21 and 22 of the objective system and is focussed by these lenses to a diffraction-limited spot A in the object plane 30. The radiation reflected by an object in the object plane traverses the imaging system constituted by the lenses 22, 21, 41 and 42, and is detected, after being divided in the beam divider 60, by the two radiation-sensitive detectors 61 and 62. By placing the pinhole diaphragms 63 and 64 in an image plane of the object these detectors effectively are point detectors. As is shown in the Figure the beam divider 60 may be arranged in between the lens elements of the imaging system, but it may alternatively be arranged between the detectors and the imaging system.

The radiation paths of the radiation towards the object and the radiation originating from the object are separated from each other by the beam splitter 71, which is, for example a semitransparent mirror passing half the incident radiation and reflecting the other half. Preferably, however, the beam splitter 71 is polarization-sensitive beam splitter and the radiation emitted by the radiation source 10 is linearly polarized. The linearly polarized radiation from the source 10 and passed by the polarization-sensitive beam splitter 71 is transformed to a circularly polarized beam by $\lambda/4$ plate 72 arranged in a diagonal position in the radiation path between the beam splitter and the object plane. The radiation reflected by the object is predominantly circularly polarized, be it in the opposite direction of polarization and is transformed by the $\lambda/4$ plate 72 to a predominantly linearly polarized radiation beam whose plane of the direction of polarization is now, however, perpendicular to the plane of the direction of polarization of the original beam. The radiation from the object is reflected predominantly in the direction of the divider 60 by the polarization-sensitive beam splitter so that the observed radiation intensity is higher than when using a neutral beam splitter.

Since the microscope observes only one point of the object, means to move the object and the radiation spot formed thereon or therein with respect to each other are required for forming an image of the object. In the embodiment of FIG. 3 there is provided a pivotal mirror 73 oscillating around a shaft 74 perpendicular to the plane of the drawing. As a result of the radiation spot and hence the observed point is moved in one direction in the object plane. Movement in the other direction can be realised by a second pivotal mirror or by moving the table on which the object is secured.

By placing the pivotal mirror 73 in the common radiation path of the radiation towards the object and the radiation originating from the object, a single pivotal mirror may suffice and synchronization between a plurality of pivotal mirrors is superfluous.

Instead of a pivotal mirror other scanning or beam-deflecting facilities are possible such as for example an acousto-optical element or a rotating reflecting polygon.

What is claimed is:

1. A scanning microscope for observing an object placed in an object plane, comprising a coherent radiation source, an objective system for focussing radiation emitted by the radiation source to a radiation spot in the object plane and a radiation-sensitive detection system comprising two radiation detectors which are arranged in such a way that radiation from the two discrete halves of the radiation beam originating from the radiation spot is detected by different respective detectors, characterized in that the detectors are point detectors separated from each other, in that a beam divider is arranged in the radiation path from the object plane to the radiation detectors and in that an imaging system with which the object plane is imaged on the detector is arranged between the object plane and each detector.

2. A microscope as claimed in claim 1, characterized in that the beam divider is constituted by a double optical wedge.

3. A microscope as claimed in claim 1, in which the radiation reflected by the object is detected, characterized in that a beam splitter is arranged in the radiation path from the radiation source to the object plane.

4. A microscope as claimed in claim 3, characterized in that the radiation source is suitable for emitting a linearly polarized beam, in that the beam splitter is a polarization-sensitive beam splitter and in that a $\lambda/4$ plate is arranged between the beam splitter and the object plane, in which $\lambda$ is the wavelength of the radiation used.

5. A microscope as claimed in claim 3, characterized in that the objective system and the imaging system have at least one optical element in common.

6. A microscope as claimed in claim 3, characterized in that beam-deflecting means are arranged between the beam splitter and the object plane.

7. A microscope as in claim 1 wherein each point detector comprises a pin hole diaphragm and a radiation sensitive element.

* * * * *